US008727671B2

(12) United States Patent
Sundholm

(10) Patent No.: US 8,727,671 B2
(45) Date of Patent: May 20, 2014

(54) WASTE CONVEYING SYSTEM

(75) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 356 days.

(21) Appl. No.: 12/678,561

(22) PCT Filed: Sep. 5, 2008

(86) PCT No.: PCT/FI2008/050499

§ 371 (c)(1), (2), (4) Date: Mar. 17, 2010

(87) PCT Pub. No.: WO2009/037376

PCT Pub. Date: Mar. 26, 2009

(65) Prior Publication Data

US 2010/0215443 A1 Aug. 26, 2010

(30) Foreign Application Priority Data

Sep. 18, 2007 (FI) ...................................... 20075652
Nov. 28, 2007 (FI) ...................................... 20075847
Jan. 15, 2008 (FI) ...................................... 20085030

(51) Int. Cl.
*B65G 53/10* (2006.01)

(52) U.S. Cl.
USPC ........... 406/145; 406/151; 406/168; 406/198; 141/65; 132/333

(58) Field of Classification Search
USPC .................... 406/145, 151, 168, 198; 141/65; 132/333
See application file for complete search history.

(56) References Cited

U.S. PATENT DOCUMENTS

| | | | | | |
|---|---|---|---|---|---|
| 3,661,239 | A | | 5/1972 | Freeman | |
| 3,951,461 | A | | 4/1976 | De Feudis | |
| 4,046,271 | A | | 9/1977 | Klosk | |
| 4,171,853 | A | * | 10/1979 | Cleaver et al. | 406/48 |
| 4,213,479 | A | * | 7/1980 | Pearson | 137/493 |
| 4,415,297 | A | * | 11/1983 | Boring | 406/168 |
| 4,899,669 | A | * | 2/1990 | Dumbaugh | 110/101 C |
| 4,973,203 | A | * | 11/1990 | Oftedal | 406/152 |
| 4,995,765 | A | * | 2/1991 | Tokuhiro et al. | 406/117 |
| 5,074,718 | A | * | 12/1991 | Ushitora et al. | 406/151 |
| 5,083,704 | A | | 1/1992 | Rounthwaite | |
| 5,100,266 | A | * | 3/1992 | Ushitora et al. | 406/120 |
| 5,183,086 | A | * | 2/1993 | Fanta et al. | 141/10 |
| 5,615,701 | A | * | 4/1997 | Yamabe et al. | 137/205 |
| 5,647,414 | A | * | 7/1997 | Brittain et al. | 141/231 |

(Continued)

FOREIGN PATENT DOCUMENTS

| | | | |
|---|---|---|---|
| FI | 50444 | C | 3/1975 |
| FI | 50891 | C | 8/1976 |

(Continued)

*Primary Examiner* — Joseph Dillon, Jr.
(74) *Attorney, Agent, or Firm* — Birch, Stewart, Kolasch & Birch, LLP

(57) ABSTRACT

A waste conveying system in which waste is collected/conveyed, e.g. by a suction system, in a waste container (10) of a regional waste space (16) or a transport container in which/from which the waste is then conveyed to further treatment. The waste space (16) and/or the waste container (10) or the transport container is arranged in a tunnel (20), such as a traffic tunnel, advantageously an underground tunnel, or in its vicinity, or there is a conveying connection from them to the tunnel (20) through which the waste is conveyed away.

16 Claims, 2 Drawing Sheets

(56) References Cited

U.S. PATENT DOCUMENTS

| | | | | |
|---|---|---|---|---|
| 5,871,027 | A * | 2/1999 | Shimizu et al. | 137/205 |
| 5,972,696 | A * | 10/1999 | Lipsey | 435/290.4 |
| 6,158,926 | A * | 12/2000 | Precetti | 406/39 |
| 6,470,925 | B2 * | 10/2002 | Hyvarinen et al. | 141/65 |
| 6,732,897 | B2 * | 5/2004 | DeHart et al. | 226/97.4 |
| 6,792,646 | B1 * | 9/2004 | Greene et al. | 15/340.1 |
| 6,896,014 | B1 * | 5/2005 | Bedi | 141/65 |
| 6,974,279 | B2 * | 12/2005 | Morohashi et al. | 406/173 |
| 7,080,960 | B2 * | 7/2006 | Burnett | 406/11 |
| 7,469,727 | B2 * | 12/2008 | Marshall | 141/65 |
| 7,708,504 | B2 * | 5/2010 | Heckendorn et al. | 406/152 |
| 7,735,526 | B2 * | 6/2010 | Palazzo | 141/1 |
| 7,785,044 | B2 * | 8/2010 | Sundholm | 406/48 |

FOREIGN PATENT DOCUMENTS

| | | | |
|---|---|---|---|
| FI | 54729 | C | 2/1979 |
| FR | 2 780 692 | A1 | 1/2000 |
| GB | 332968 | | 8/1930 |
| GB | 1 408 439 | | 10/1975 |
| JP | 5-69904 | A | 3/1993 |
| RU | 2082436 | C1 | 6/1997 |
| WO | WO 92/04920 | A1 | 4/1992 |
| WO | WO-93/13002 | A1 | 7/1993 |
| WO | WO-01/05683 | A1 | 1/2001 |
| WO | WO-2006/118578 | A1 | 11/2006 |

* cited by examiner

WASTE CONVEYING SYSTEM

BACKGROUND OF INVENTION

The invention relates to a waste conveying system.

The invention relates generally to collecting and conveying waste, such as conveying household waste, particularly treating urban waste. Like conventional waste management among dense population, in waste rooms are located waste containers in which household waste is brought, emptied to waste trucks manually and the waste truck takes the waste then to a landfill. However, this causes problems for traffic, the environment and hygiene etc as waste trucks drive around on the roads picking up waste and taking it to the landfill.

Also, systems are known in which waste is conveyed in a piping by means of suction. In these, waste is conveyed for long distances in the piping by suction. This system has, however, proven to use extreme amounts of power and requires a lot of maintenance. Several equivalent arrangements exist. Apparatuses are utilised, inter alia, for conveying waste in different institutions. Typical for them is that a vacuum apparatus is used for achieving a pressure difference, in which apparatus underpressure in the conveying pipe is provided with vacuum generators, such as vacuum pumps or an ejector apparatus. In the conveying pipe, there is typically at least one valve element by opening and closing of which make-up air coming in the pipe is regulated. Waste is conveyed along the piping for quite a long distance to a waste station which is typically located outside the population centre. From the waste station, waste is further conveyed to a landfill e.g. by waste trucks.

Conveying waste for long distances in the piping is not cost-effective in practice. Typically, a pressure difference of less than 1 bar is available in the suction (in practice 0.1-0.4 bar). The small pressure difference requires that the flow rates in the piping have to be designed high in order to make the material intended for conveying in the piping move. As the waste material passing in the pipe is irregular of its tightness, size and shape, by-pass flow is created in the piping whereby vacuum generators/suction devices generating the suction have to be dimensioned extremely large of their capacity and power.

An object of this invention is to achieve a totally novel arrangement for a waste conveying system by means of which the disadvantages of known arrangements are avoided.

BRIEF DESCRIPTION OF INVENTION

The invention is based on an idea in which a typically existing tunnel system, such as a traffic tunnel system, advantageously an underground tunnel system, is utilised in collecting and conveying waste.

The system according to the invention is mainly characterised by that a waste space and/or a waste container or a transport container is arranged in a tunnel, such as a traffic tunnel, advantageously an underground tunnel, or in its vicinity, or there is a conveying connection from them to a tunnel through which the waste container or the transport container or at least the waste is conveyed away.

The arrangement according to the invention has numerous significant advantages. A typically existing tunnel system, such as a traffic tunnel system, advantageously an underground tunnel system, is utilised in collecting and conveying waste, an environmentally-friendly and cost-effective waste conveying system, which also otherwise minimises disadvantages, is provided. By utilising the invention, the profitability of tunnel construction and/or underground construction can also be improved, because in addition to conventional traffic, such as passenger traffic, it is possible to convey waste according to the invention in the tunnels, most advantageously during slow traffic, such as during the night. By utilising a system according to the invention, it is also possible to improve traffic safety compared to the conventional system using waste trucks and to diminish environmental effects caused by the travelling of waste trucks, because in an area utilising the system the number of waste trucks driving above ground strongly decreases. An advantage of the system according to the invention is also that the dense social structure is typically located along the network of tunnel systems, such as underground, whereby it is as well cost-effective to handle waste management by means of the system according to the invention by utilising the ready tunnel infrastructure. Thus, the invention in an extraordinary way combines a piping conveying system of waste and a conveying path enabled by tunnels which can be also utilised in conveying waste.

The tunnel used by the system of the invention can also be a branch of a tunnel which is solely intended for waste conveyance but which is connected to a tunnel network, such as a traffic tunnel network, most advantageously an underground tunnel network.

In the invention, an underground tunnel usually means a tunnel and an underground part of a traffic system particularly conventional in big cities in which underground trains or equivalent travel and which is typically constructed at least partially under ground.

BRIEF DESCRIPTION OF FIGURES

In the following, the invention will be described in detail by means of an example with reference to the accompanying drawings in which FIG. 1 schematically shows a side view of a system according to the invention.

DETAILED DESCRIPTION OF INVENTION

Figures 1, 2:
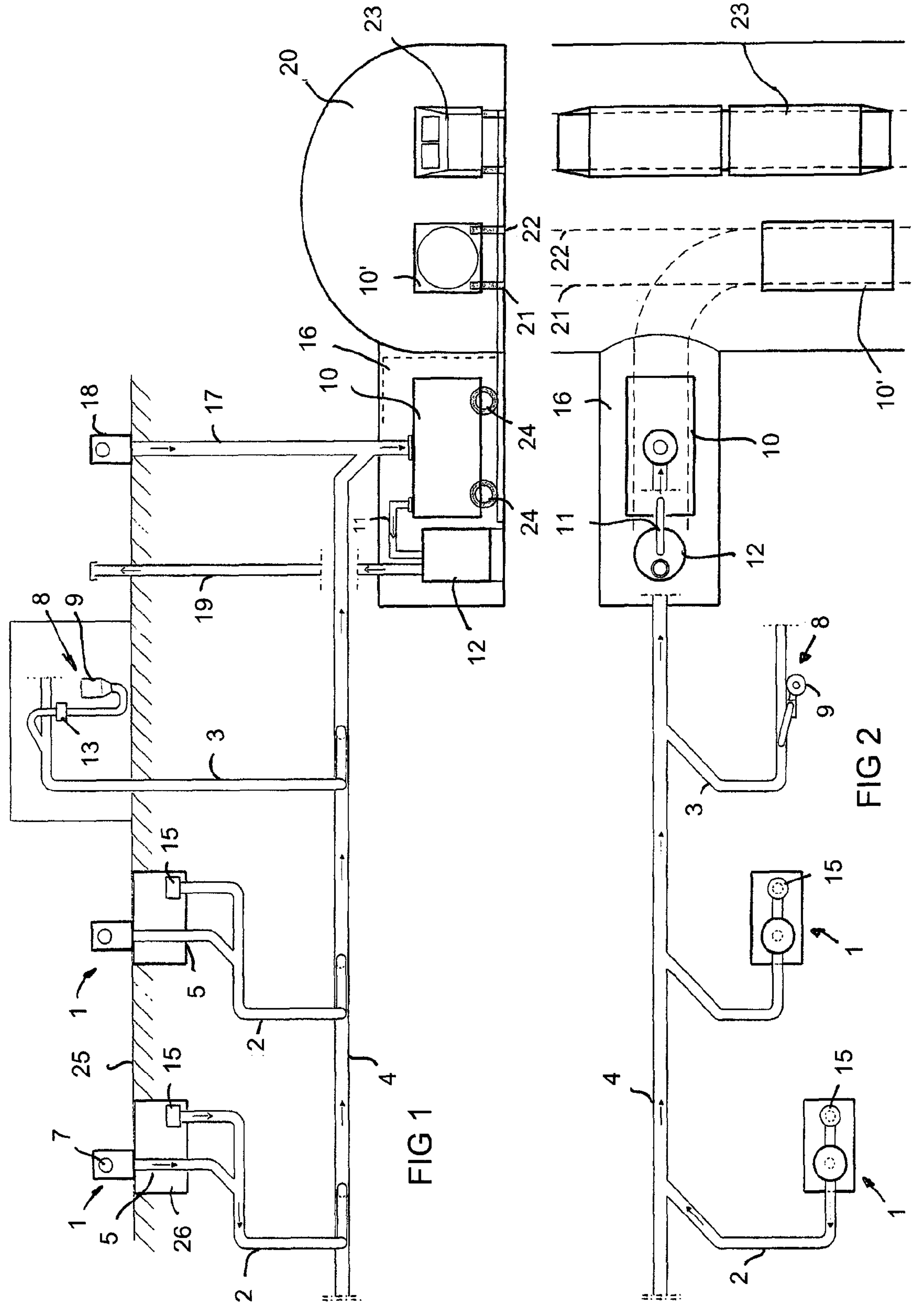
FIG. 2 shows a top view of the system of FIG. 1.

FIGS. 1 and 2 schematically show a system according to the invention. The figure shows part of a tunnel 20, such as a traffic tunnel, advantageously an underground tunnel, in a recess of which is arranged a waste space 16, particularly a waste room. According to the invention, the tunnel and its vehicle passage is utilised in conveying waste. Along the tunnel network, waste spaces 16 are arranged at suitable points, either in the tunnel space 20 and/or a space connected to it and/or such that there is a conveying connection from the waste spaces 16 for waste or for conveying a waste container in the tunnel space 20. The waste space can thus be a branch of a tunnel which is solely intended for waste conveyance but which is connected to an underground tunnel network. Containers 10 located in the waste spaces 16 are emptied to a waste transport carriage or a waste transport truck which conveys waste along the tunnel network for further processing, such as to a combustion plant, a landfill or some other treatment site. Alternatively, the waste container/transport container can also be conveyed aboard a waste transport carriage or a transport truck and taken to a further treatment site. In the example of the figure, the waste container 10 is provided with wheels 24 and is thus a waste transport carriage which can be conveyed in the tunnel e.g. along a track pair 21, 22. The waste transport carriage can be separate or part of a waste transport train which is arranged to travel in the tunnel.

For clarity, the figure includes another waste container 10' provided with wheels i.e. waste transport carriage in the actual tunnel space 20. In the underground tunnel, there is arranged a vehicle passage, particularly the track pair 21, 22, which traffic units 23 of the underground system, such as underground trains and underground carriages, utilise for travelling.

According to an embodiment of the invention, the tunnel is used for conveying waste particularly when other traffic in the tunnel, such as the passenger traffic of the underground, is slow or stopped.

According to the invention, the tunnel, such as a traffic tunnel, advantageously an underground tunnel, is thus used as part of the conveying system of waste.

In FIGS. 1 and 2, reference number 1 designates a feed station of waste material intended for conveyance from which station waste, such as household waste, is fed to the conveying system. The feed station 1 can be a feed opening of a waste chute 5 inside a building which is covered by an openable and closable hatch 7. In the figure, feed points are shown simplified when set on top of a ground surface 25, whereby a conveying piping mainly passes below the surface 25. Also, a suction point 8 can be used in connection with which there is e.g. a feed funnel 9. The system typically comprises several feed stations 1 or suction points 8 from which waste material intended for conveyance is fed to the conveying piping 2, 3, 4. Typically, the conveying piping comprises a main conveying pipe 4 into which several feed stations 1 and/or suction points 8 can have been connected through feed pipes 2, 3. The fed waste material is conveyed along the conveying piping 2, 3, 4, 5 to the waste container 10 in which the conveyed waste material is separated from conveying air. It is also possible to use a separate waste container in which the waste separated from conveying air in the separating device is conveyed. The waste container 10 can be e.g. a waste carriage shown in the figure or a freight container or an intermediate container. According to FIG. 2, from the waste container 10 leads a pipe 11 to a vacuum unit 12. By means of the vacuum unit 12, required underpressure is provided in the conveying piping 4 for the conveyance of waste material from feed stations 1 and suction points 8 to the waste container 10. The vacuum unit 12 can be e.g. a vacuum pump, an ejector device or equivalent. Underpressure provides the required force for conveying the material in the conveying piping.

In the example of the figure, in the feed pipe 2, 3 is arranged a valve element 13, 15 which is opened and closed so that waste material is conveyed from the feed pipe 2, 3 to the conveying pipe 4. The valve 13, 15 being open, make-up air flows into the piping, whereby the waste material conveys along the piping 2, 3, 4 into the waste carriage, freight container or waste container 10. Material is fed to the feed pipe from the feed station 1 through the waste chute 5 or from the suction point 8. When there is underpressure in the conveying pipe 4, make-up air is fed to the conveying pipe 4. The valve 15 being in connection with the feed station 1 i.e. the make-up air valve is located in the embodiment of the figures in a space 26 located below the ground surface 25 which comprises an air-permeable grate e.g. as the roof of the space.

The figures show an arrangement of the waste space in which the conveying pipe 4 brings the waste to the waste container 10. The vacuum generator 12 i.e. suction device is in connection with the waste container 10 through the pipe 11. Through an air outlet pipe 19, air used in the conveyance is led out of the system. When required, the outlet air can be led through cleaning devices before leading it out.

The waste container 10 is arranged in a waste space 16, such as a waste room. The waste space is arranged in a tunnel 20, into connection with a tunnel, particularly an underground tunnel, or in its vicinity. In the waste space 16, there can be connected a waste chute 17 in which waste material is fed from above gravitationally from a feed point 18. Waste set in the feed point falls along the waste chute 17 to the waste container 10 of the waste space 16 or directly to a waste carriage.

From the waste container 10 of the waste space 16, waste can be conveyed to the transport carriage in several ways. A lifting device can be used by which the waste or the waste container/transport container is conveyed aboard of the transport carriage. It is also possible to use a suction system by which the waste is conveyed from the waste container into a container of the transport carriage. It is also possible to use the embodiment of the figure in which the waste container 10 is also the transport carriage. The waste container 10 can be a freight container which is filled with waste and which is lifted to the carriage for conveyance.

In the figure, the ground surface is designated with reference number 25. The feed funnel 9 of the suction point 8 can be e.g. a waste bin.

Figure 3:
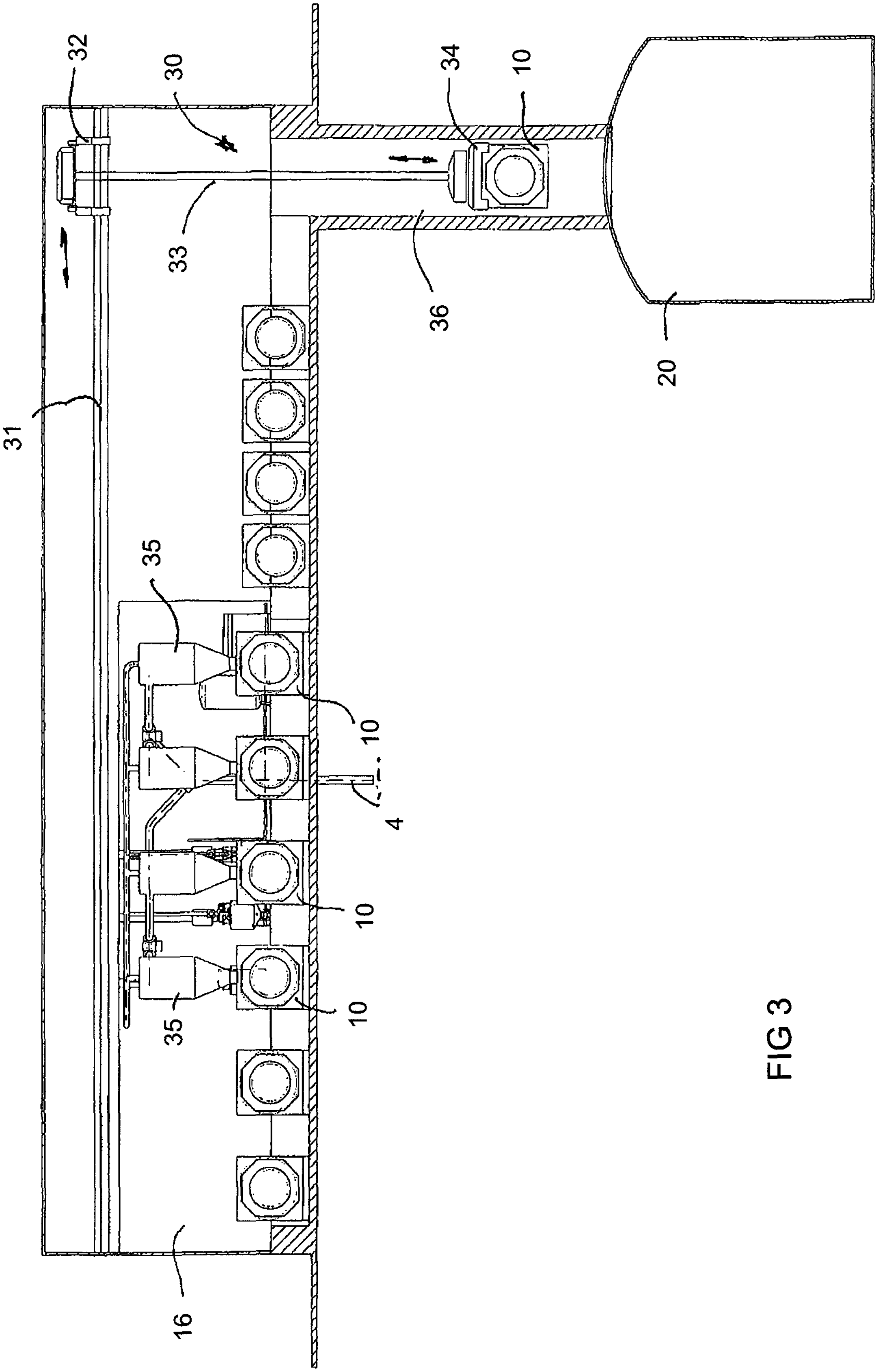
FIG. 3 shows a detail of another embodiment of the system according to the invention.

FIG. 3 shows a detail of another embodiment of the system according to the invention. There, the waste space 16 is arranged in the vicinity of the tunnel 20 so that a connection is arranged from the waste space 16 or from its vicinity to the tunnel 20. The waste space can have been arranged e.g. on the ground surface but it has a connection to the tunnel 20. In the arrangement according to the embodiment, in the waste space 16 is arranged a conveying device 30. The conveying device 30 is e.g. a lifting device by which the waste container 10 is conveyed from the waste space 16 and lowered thought a chute 36 in the tunnel 20. In the arrangement according to FIG. 3, the conveying device 30 comprises a passageway 31, along which a lifting carriage 32 is arranged to move, and lifting means 33 arranged in the lifting carriage, at the opposite end in relation to the lifting carriage 32 of which are arranged gripping means 34 by which the conveying device can grip the waste container 10. In the embodiment according to FIG. 3, in the waste space 16 there are several separator elements 35, e.g. separator elements of the cyclone type, in which the waste material is separated from the conveying air. From the separator element 35, waste material is conveyed, e.g. from the effect of gravity, to the waste container 10 through an outlet opening of the separator element which outlet opening in the embodiment of FIG. 3 is arranged in the lower part of the separator element being the shape of a truncated cone. The outlet opening of the separator element and the feed opening of the waste container are arranged in incidence. FIG. 3 does not show a vehicle travelling in the tunnel, e.g. a waste transport train, aboard of which the waste container 10 can be lowered through the chute 36. Equivalently, e.g. an empty waste container can also be lifted from the tunnel 20 into the waste space 16 by the conveying device 30 through the chute 36.

Next, some advantageous embodiments of the system according to the invention will be described:

The invention relates to a waste conveying system in which waste is collected/conveyed, e.g. by a suction system, in a waste container 10 of a regional waste space 16 or a transport container in which/from which the waste is then conveyed to further treatment. The waste space 16 and/or the waste container 10 or the transport container is arranged in a tunnel 20, such as a traffic tunnel, advantageously an underground tunnel, or in its vicinity, or there is a conveying connection from them to the tunnel 20 through which the waste is conveyed away. The waste is conveyed from the tunnel by a conveying means, such as a transport carriage, a train, such as an underground train, a transport truck or equivalent.

The system comprises, according to an advantageous embodiment, a waste transport carriage 10' travelling in the tunnel 20 in which waste is conveyed from the waste container 10 and/or in which the waste container/transport container is conveyed. Equivalently, the system can comprise at least one transport truck travelling in the tunnel in which waste is conveyed from the waste container 10 and/or in which the waste container/transport container is conveyed.

The system further comprises at least one feed point 18 which is arranged by a waste chute 17 into connection with the waste container 10 of the waste space 16 or the transport container.

The system comprises a feed and conveying piping 2, 3, 4 along which waste is conveyed by means of a pressure difference from one or more feed points 1, 8.

There are arranged several of feed points 1, 8, 18 distributedly in the area of the system.

The system comprises several waste spaces 16.

In the system, the waste container 10 is emptied to the transport carriage by an emptying device, such as a suction device or a lifting device, or manually.

In the system, the waste container 10 is conveyed to the transport carriage 10' by a conveying device or a lifting device or manually.

In the system, waste is conveyed in the underground tunnel 20 particularly during slow passenger traffic or when passenger traffic is stopped.

At least part of the waste conveying piping 4 is arranged in the underground tunnel 20.

The waste container 10 is part of the waste transport carriage 10'.

Waste is directly conveyed to the waste container 10 of the waste transport carriage 10'.

The waste carriages 10' are conveyed in the tunnel by a conveying unit, such as a locomotive, in which several waste carriages 10' can be connected.

According to the embodiment of FIG. 3, the waste space 16 is located upper than the underground tunnel 20 in the vertical direction.

The waste container 10 is lowered in the embodiment of FIG. 3 from the waste space 16 by a conveying device 30 to the underground tunnel 20, advantageously directly in a waste transport carriage or equivalent. Equivalently, it is possible to bring through the tunnel 20 e.g. empty waste containers 10 in the waste space 16, whereby the conveying device 30 lifts them from the tunnel 20 through a chute 36 to the waste space 16.

In accordance with an embodiment of the system according to the invention, the suction conveying system of waste is used at relatively short distances and it is connected e.g. to the tunnel system so that waste rooms are designed in the immediate vicinity of the tunnel network in which waste collection carriages and waste containers are located. It is also possible to locate waste chutes directly on top of the waste room, whereby waste falls directly in the container. The containers are filled by the vacuum conveying system or the waste chute locally and the conveyance of the waste and/or the containers takes place by means of underground waste carriages or waste freight containers directly or indirectly to the landfill or the combustion plant. The containers can be intermediate containers from which waste is sucked in the transport carriage. Waste conveyance takes advantageously place at night, whereby the traffic system of the tunnel is in minor use. By means of the invention is provided an environmentally-friendly, cost-effective and otherwise non-detrimental waste conveying system. By utilising the invention, the profitability of tunnel construction, traffic system construction, particularly underground construction, can be improved, because in addition to passenger traffic, it is possible to convey waste according to the invention in the tunnels e.g. during the night. By utilising the system according to the invention, it is possible to considerably decrease the traffic of waste trucks, particularly when the system is connected to a rail traffic system, such as an underground system.

It is also possible to consider that part or whole of the main pipelines of the vacuum conveying system is arranged to travel in the tunnel.

The invention relates to a collection and conveying system of waste, in which waste is collected/conveyed e.g. by a suction system in an intermediate container of a regional waste space or a transport container which is located in the vicinity of a tunnel, such as a traffic tunnel, advantageously an underground tunnel, and through which the waste is conveyed away in the same tunnel in which traffic, such as motor traffic or train traffic and/or underground traffic, travels.

The waste transport carriage/train or the waste transport truck can be provided with a suction system which sucks the waste from the intermediate container of the waste room of the tunnel to the transport carriage.

The waste container can be a freight container which is filled with waste and which is transferred to a carriage or a truck for conveyance.

The waste chutes are arranged directly on top of the container of the waste room particularly for larger pieces of waste, such as bin bags, cardboard boxes etc.

The main pipeline of the conveying system is installed totally or partially in the tunnel.

The tunnel can also be some other than a traffic tunnel or an underground tunnel. It can be e.g. a branch of a tunnel which is solely intended for waste conveyance but which is connected to a traffic tunnel network, advantageously to an underground tunnel network.

It is obvious for those skilled in the art that the size of the system is dependent on the structure and requirements of the target of application, such as the amount of waste produced at the site of the target of application, and on many other factors.

It is obvious to those skilled in the art that the invention is not limited to the embodiments described above, but it may be varied within the scope of the enclosed claims. When necessary, the features possibly described in this specification together with other features may also be used separately from each other.

The invention claimed is:

1. A waste conveying system, comprising:

a plurality of feed stations for receiving waste material;

a plurality of feed pipes, each feed pipe being operatively connected to one of said plurality of feed stations for receiving the waste material from the feed stations;

a conveying pipe operatively connected to each of said plurality of feed pipes for receiving the waste material from the feed pipes;

at least one waste container at a waste space directly connected to said conveying pipe for receiving the waste material directly from the conveying pipe, the at least one waste container configured and operable for disconnection from the conveying pipe and for movement from the waste space;

a vacuum pump having an inflow side operatively connected to a portion of the at least one waste container away from where the waste material is received directly from the conveying pipe, and an outflow side connected to an outlet pipe leading to an outside of the waste conveying system, the vacuum pump being adapted to create a pressure reduction in each of the feed stations, in each of the feed pipes, in the conveyor pipe, and in the at least one waste container, in order to convey the waste material received at each of the feed stations into the at least one waste container by drawing air into and through the conveying pipe and the at least one waste container, and then out of the at least one waste container, through the vacuum pump, and out through the outlet pipe to the outside of the waste conveying system.

2. A system according to claim 1, wherein the waste container is a waste transport carriage which is movable from the waste space to a tunnel, and when in the tunnel, the waste transport carriage is movable though the tunnel.

3. A system according to claim 1, wherein the system further comprises:

at least one of the feed points is arranged by a waste chute which communicates with the waste container in the waste space.

4. A system according to claim 1, wherein the waste container is part of a waste transport carriage or a waste transport truck.

5. A system according to claim 4, wherein the waste material is led directly to the waste container of the waste transport carriage.

6. A system according to claim 1, wherein the feed points are distributedly arranged in the system.

7. A system according to claim 1, wherein the waste space comprises several waste spaces.

8. A system according to claim 2, wherein the transport carriage is adapted to convey the waste material though the tunnel when other traffic is slow, or is not present in the tunnel.

9. A waste conveying system according to claim 1, wherein the plurality of feed pipes, the conveying pipe, and the at least one waste container are directly connected to each other via sealed interconnections.

10. A system according to claim 1, wherein the waste material conveyed through the system is conveyed into the at least one waste container exclusively by gravity and the pressure reduction created by the vacuum pump.

11. A system according to claim 1, wherein the waste material received in the feed stations is the only material conveyed through feed pipes and the conveying pipe, and into the at least one waste container.

12. A system according to claim 1, further comprising an valve connected to one or more of the feed pipes, the valve being openable for providing make-up air in the feed pipes, in the conveying pipe, and in the at least one waste container.

13. A system according to claim 1, further comprising:

an underground waste space, and wherein the vacuum pump is a vacuum generator housed in the underground waste space, wherein the feed stations are located above a ground surface, and the vacuum generator includes an air outlet pipe passes up from the underground waste space to above the ground surface.

14. A system according to claim 1, further comprising:

an underground waste space, wherein the vacuum pump is a vacuum generator fixedly housed in the underground waste space, wherein the waste container is provided with wheels enabling the waste container to be wheeled away from the vacuum generator and out of the underground waste space and into a tunnel.

15. A waste conveying system, comprising:

a plurality of feed stations for receiving waste material;

a plurality of feed pipes, each feed pipe being operatively connected to one of said plurality of feed stations for receiving the waste material from the feed stations;

a conveying pipe operatively connected to each of said plurality of feed pipes for receiving the waste material from the feed pipes;

at least one waste container directly connected to said conveying pipe for receiving the waste material directly from the conveying pipe;

a vacuum pump operatively connected to an outflow side of the at least one waste container away from where the waste material is received directly from the conveying pipe, the vacuum pump being adapted to create a pressure reduction in each of the feed stations, in each of the feed pipes, in the conveyor pipe, and in the at least one waste container, in order to convey the waste material received at each of the feed stations into the at least one waste container by drawing air into and through the conveying pipe and the at least one waste container, and then out of the at least one waste container, and further comprising:

an underground waste space for positioning said at least one waste container; and a tunnel operatively positioned adjacent to said underground waste space, wherein after the waste material is conveyed to said at least one waste container, said at least one waste container is adapted to be moved from the underground waste space to the tunnel.

16. The system according to claim 15, wherein the vacuum pump and the at least one waste container are underground, and the waste material is received in the at least one waste container without passing through the vacuum pump.

* * * * *